US012741483B2

(12) United States Patent
Kurosaka et al.

(10) Patent No.: US 12,741,483 B2
(45) Date of Patent: Sep. 22, 2026

(54) RAILWAY WHEEL, AND WHEELSET FOR RAILWAY VEHICLES

(71) Applicant: NIPPON STEEL CORPORATION, Tokyo (JP)

(72) Inventors: Ryuta Kurosaka, Tokyo (JP); Takanori Kato, Tokyo (JP); Taizo Makino, Chiyoda-ku (JP); Yuichiro Yamamoto, Tokyo (JP); Naomichi Tsuji, Tokyo (JP); Naruo Miyabe, Tokyo (JP); Taketo Maejima, Tokyo (JP); Taro Osaka, Tokyo (JP); Katsutoshi Tatebe, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 158 days.

(21) Appl. No.: 18/846,587

(22) PCT Filed: Mar. 14, 2022

(86) PCT No.: PCT/JP2022/011272
§ 371 (c)(1),
(2) Date: Sep. 12, 2024

(87) PCT Pub. No.: WO2023/175663
PCT Pub. Date: Sep. 21, 2023

(65) Prior Publication Data
US 2025/0187368 A1 Jun. 12, 2025

(51) Int. Cl.
*B60B 17/00* (2006.01)

(52) U.S. Cl.
CPC ...... *B60B 17/0006* (2013.01); *B60B 2310/54* (2013.01); *B60Y 2200/30* (2013.01)

(58) Field of Classification Search
CPC ............ B60B 17/0006; B60B 2310/54; B60B 2310/60; B60B 2310/202; B60B 37/04; B60Y 2200/30
(Continued)

(56) References Cited

U.S. PATENT DOCUMENTS 6,033,001 A * 3/2000 Fujimura ................ B21K 1/38 295/21
10,089,422 B2 * 10/2018 Sumikawa .............. G01N 3/08
2018/0001380 A1 * 1/2018 Yoshida ................. G06F 30/20

FOREIGN PATENT DOCUMENTS

CN 110539585 A * 12/2019 ............ C21D 6/005
DE 69815758 T2 * 4/2004 .............. C21D 9/34
(Continued)

*Primary Examiner* — S. Joseph Morano
*Assistant Examiner* — Eva L Comino
(74) *Attorney, Agent, or Firm* — Greer Burns & Crain Ltd.

(57) ABSTRACT

A railway wheel that is capable of suppressing the propagation of cracks is provided. A railway wheel according to the present disclosure includes a hub part, a rim part including a tread and a flange, and a web part. In the railway wheel, in an outer layer of the rim part that includes the tread, an elastic limit $\sigma_0$ is 430 MPa or more, an initial kinematic hardening coefficient C is 130 GPa or more, and a kinematic hardening coefficient reduction ratio $\gamma$ is 400 or less. The initial kinematic hardening coefficient C and the kinematic hardening coefficient reduction ratio $\gamma$ satisfy Formula (1).

[Expression 1]

$$470 \leq \frac{C}{\gamma}\{1-\exp(-0.007\gamma)\} \tag{1}$$

2 Claims, 6 Drawing Sheets

(58) Field of Classification Search
USPC .............................................................. 295/1
See application file for complete search history.

(56) References Cited

FOREIGN PATENT DOCUMENTS

| | | | | | |
|---|---|---|---|---|---|
| JP | 10-119503 | A | | 5/1998 | |
| JP | H10119503 | A | * | 5/1998 | ............... B21K 1/38 |
| JP | 2001158940 | A | * | 6/2001 | ............. C22C 38/44 |
| JP | 2001-517177 | A | | 10/2001 | |
| JP | 2019143999 | A | * | 8/2019 | |
| JP | 2020056747 | A | * | 4/2020 | |
| JP | 2021063258 | A | * | 4/2021 | |
| WO | 98/43834 | | | 10/1998 | |
| WO | WO-9843834 | A1 | * | 10/1998 | ................ B23P 6/00 |

* cited by examiner

Opposite-To-Flange Side
(Front Surface Side)
Axial Direction
Flange Side
(Back Surface Side)
100
X
60
Inside
10
11
42a
41a
30
Radial Direction
42b
41b
24
25
20
Outside
21
23
22

RAILWAY WHEEL, AND WHEELSET FOR RAILWAY VEHICLES

TECHNICAL FIELD

The present disclosure relates to a railway wheel, and a wheelset that is used for railway vehicles.

BACKGROUND ART

A railway vehicle travels on rails constituting a railway track. A railway vehicle is equipped with a plurality of railway wheels. The railway wheels support the vehicle, and keep in contact with the rails and move on the rails while rotating thereon. Consequently, cyclic stress due to rolling contact is applied to the railway wheels.

The surface of a railway wheel that comes into contact with the top surface of a rail is referred to as a "tread". A tread brake is known as one type of braking method for a railway vehicle. A tread brake is a braking method which, by pressing brake shoes against the treads of railway wheels, generates a frictional force between the treads and the brake shoes to thereby apply a brake to the railway vehicle using the frictional force. When utilizing a tread brake to apply a brake to a railway vehicle, frictional heat is produced between the treads and the brake shoes.

In addition to being subjected to cyclic stress due to rolling contact, frictional heat is also applied to the railway wheels when a brake is applied to the railway vehicle. In some cases, a crack occurs in a railway wheel due to cyclic stress and frictional heat. If the crack propagates, there is a possibility that crack damage will occur in the railway wheel. Therefore, there is a need for a railway wheel that can suppress cracks.

Railway wheels that are capable of suppressing cracks are proposed in, for example, Japanese Patent Application Publication No. 10-119503 (Patent Literature 1) and Japanese Translation of PCT International Application Publication No. 2001-517177 (Patent Literature 2).

The railway wheel disclosed in Patent Literature 1 is a solid rolled wheel for a railway vehicle having a shape in which a rim part is displaced from a hub part towards the outside of a track. This railway wheel is characterized in that, when a dimension between perpendicular lines which are drawn from the center of the plate thickness of a web part near the end of a curve on a flange side of a fillet of the rim part and from the center of the plate thickness of a web part near the end of a curve on a side opposite to a flange side of a fillet of the hub part to the axial centerlines thereof, respectively, is defined as a displacement amount δ of the rim part relative to the hub part, and a dimension between perpendicular lines which are drawn from the center of the plate thickness of the web part near the end of the curve on the flange side of the fillet of the rim part and from the center in the axial direction of the inner diameter of the rim part to the axial centerlines thereof, respectively, is defined as a displacement amount λ of the web part on the rim side, the displacement amount 2 is 5 mm or more and the displacement amount δ is 40 mm or more. In Patent Literature 1, thermal stress that arises in the web part is suppressed by making the displacement amount δ of the web part a large amount. It is described in Patent Literature 1 that by this means a railway wheel that is excellent in performance with respect to crack damage and the like caused by thermal cracks that occurs in the tread or flange surface of the railway wheel is obtained.

In the railway wheel disclosed in Patent Literature 2, at least one recess is formed at a portion where there is a risk of crack occurrence, and at least one surface coating layer is formed in the recess. The surface coating layer consists of a base material and an additive. The base material is melted by heat radiation, in particular by laser irradiation, while at the same time adding the additive to the melt to impart properties that are different from the base material to the railway wheel. The surface coating layer is formed in the recess as a number of linear bodies located beside each other in the recess in a manner such that the linear bodies fill the recess, and the outer surface of the surface coating layer is finished to a height that is flush with the outer surface of the adjacent base material. In Patent Literature 2, a surface protection layer is formed by laser irradiation at a portion where there is a risk of crack occurrence. It is described in Patent Literature 2 that by this means surface fatigue and crack occurrence are prevented, and at the same time, deviation from a perfect circle and corrosion can be prevented.

CITATION LIST

Patent Literature

Patent Literature 1: Japanese Patent Application Publication No. 10-119503

Patent Literature 2: Japanese Translation of PCT International Application Publication No. 2001-517177

SUMMARY OF INVENTION

Technical Problem

In this connection, the following stages exist before a crack that occurred in a railway wheel results in crack damage. The first stage is a crack occurrence stage. As mentioned above, cyclic stress caused by rolling contact with the rail is applied to the tread. Furthermore, when a brake is applied to the railway vehicle, frictional heat that is generated by friction with a brake shoe arises at the tread. A crack occurs in the tread due to the frictional heat load applied to the tread in addition to the cyclic stress caused by rolling contact.

The second stage is a crack propagation stage. The crack that occurred in the tread propagates parallel to the tread, or propagates from the tread toward the inside of the railway wheel. If a driving force for crack propagation in the outer layer of the railway wheel is high, the crack will easily propagate.

The third stage is a crack damage stage. The crack propagates and the railway wheel suffers crack damage. If the railway wheel suffers crack damage, the life of the railway wheel will decrease.

The railway wheel disclosed in Patent Literature 1 suppresses thermal stress that arises in a web part. By this means, thermal cracks that occur in the tread of the railway wheel are suppressed. In the railway wheel disclosed in Patent Literature 2, a surface protection layer is formed at portions where there is a risk of crack occurrence. By this means, crack occurrence is suppressed. In other words, it is considered that in Patent Literature 1 and Patent Literature 2, suppressing the occurrence of cracks in the first stage is mainly considered.

The occurrence of cracks can be suppressed by the railway wheels disclosed in Patent Literature 1 and Patent Literature 2. However, in the railway wheels disclosed in Patent Literature 1 and Patent Literature 2, in some cases it may be difficult to suppress the propagation of a crack that has occurred.

An objective of the present disclosure is to provide a railway wheel that is capable of suppressing the propagation of a crack, and a wheelset for railway vehicles that is a wheelset equipped with the railway wheel that is capable of suppressing the propagation of a crack.

Solution to Problem

A railway wheel according to the present disclosure includes:

a hub part that forms an inner circumferential portion of the railway wheel, and that has a through hole for inserting an axle of a railway vehicle;

a rim part that forms an outer circumferential portion of the railway wheel, and that includes a tread to come into contact with a top surface of a rail on which the railway vehicle travels, and a flange protruding outward from the tread in a radial direction of the railway wheel; and an annular web part that connects the hub part and the rim part;

wherein:

in an outer layer of the rim part that includes the tread, an elastic limit $\sigma_0$ is 430 MPa or more, an initial kinematic hardening coefficient C is 130 GPa or more, and a kinematic hardening coefficient reduction ratio $\gamma$ is 400 or less, where, the initial kinematic hardening coefficient C and the kinematic hardening coefficient reduction ratio $\gamma$ satisfy Formula (1).

[Expression 1]

$$470 \leq \frac{C}{\gamma}\{1-\exp(-0.007\gamma)\} \tag{1}$$

A wheelset for railway vehicles according to the present disclosure includes:

a first railway wheel and a second railway wheel that are described above; and the axle that is inserted into the through hole of the first railway wheel and the second railway wheel, and that extends in a rotational axis direction of the first railway wheel and the second railway wheel.

Advantageous Effects of Invention

The railway wheel of the present disclosure can suppress the propagation of a crack. The wheelset for railway vehicles of the present disclosure can suppress the propagation of a crack in a railway wheel.

DESCRIPTION OF EMBODIMENTS

Figure 1:
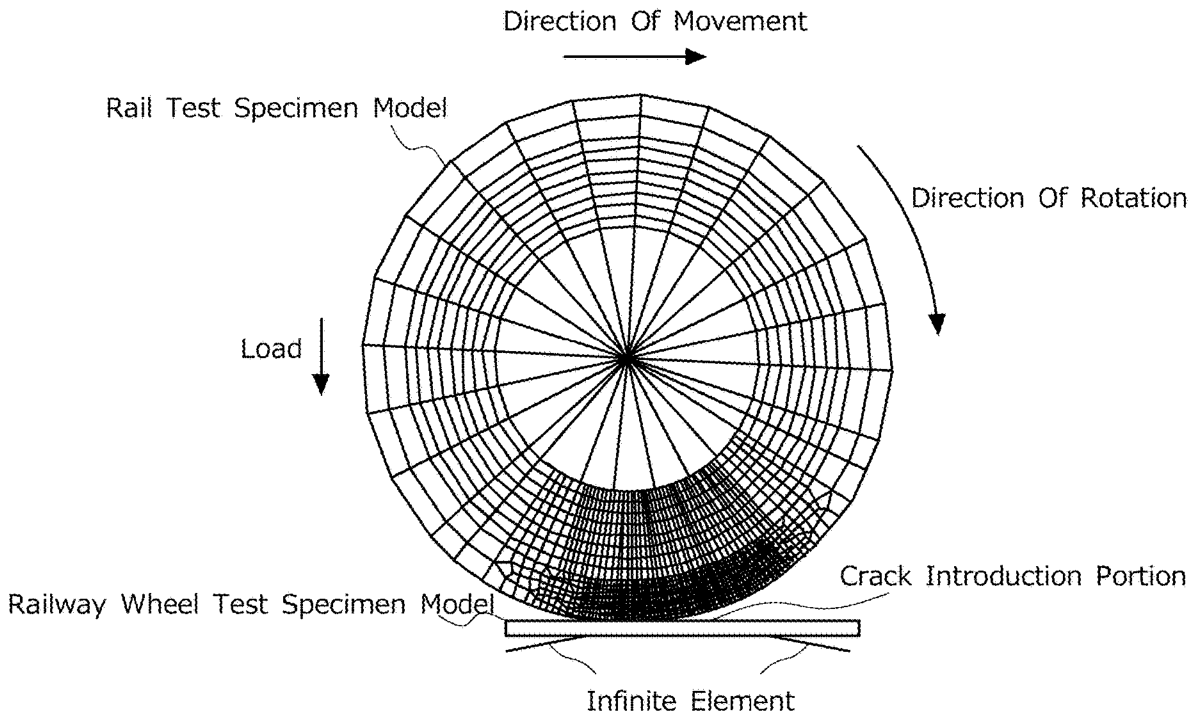
FIG. 1 is a diagram illustrating an FEM analysis model.

[Technical Idea of Railway Wheel of Present Disclosure]

The present inventors investigated methods for suppressing the propagation of a crack even in a case where the crack occurs in the tread of a railway wheel.

Railway wheels are subjected to cyclic stress due to rolling contact. Therefore, work hardening occurs in railway wheels accompanying cyclic plastic deformation. Accordingly, when investigating the propagation of cracks, it is necessary to take into consideration work hardening that accompanies cyclic plastic deformation. The nonlinear kinematic hardening law is known as a model for expressing the stress-strain response during cyclic plastic deformation. The nonlinear kinematic hardening law is expressed by Formula (2).

[Expression 2]

$$\sigma_{eq} = \sigma_0 + \frac{C}{\gamma}\{1-\exp(-\gamma\varepsilon_{peq})\} \tag{2}$$

In the formula, $\sigma_{eq}$: equivalent stress (MPa), $\sigma_0$: elastic limit (MPa), C: initial kinematic hardening coefficient (GPa), and $\gamma$: kinematic hardening coefficient reduction ratio.

In order to differentiate Formula (2), it is expressed as Formula (3).

[Expression 3]

$$f(\varepsilon_{peq}) = \sigma_0 + \frac{C}{\gamma}\{1-\exp(-\gamma\varepsilon_{peq})\} \tag{3}$$

When Formula (3) is differentiated with respect to $\varepsilon_{peq}$, Formula (4) is obtained.

[Expression 4]

$$f'(\varepsilon_{peq}) = C\exp(-\gamma\varepsilon_{peq}) \tag{4}$$

When $\varepsilon_{peq}$=0, f (0)=C, and therefore the initial kinematic hardening coefficient C corresponds to the kinematic hardening coefficient when the plastic strain is 0. In other words, the initial kinematic hardening coefficient C corresponds to the slope of the graph when the plastic strain is 0 in the stress-strain curve.

By taking the natural logarithm of both sides of Formula (4), Formula (5) is obtained.

[Expression 5]

$$\ln f'(\varepsilon_{peq}) = -\gamma\varepsilon_{peq} + \ln C \quad (5)$$

The kinematic hardening coefficient reduction ratio $\gamma$ corresponds to the slope of Formula (5), which is a linear function. In other words, the kinematic hardening coefficient reduction ratio $\gamma$ corresponds to the slope of a graph in which the natural logarithm of the kinematic hardening coefficient is the ordinate and the plastic strain is the abscissa.

The equivalent stress $\sigma_{eq}$ in Formula (2) corresponds to the strength after work hardening. It is considered that if the strength after work hardening is high, the propagation of a crack can be suppressed. That is, it is considered that if the equivalent stress $\sigma_{eq}$ in Formula (2) can be increased, the propagation of cracks can be suppressed.

On the other hand, work hardening of a railway wheel begins from the moment that the railway wheel starts rolling on rails. If work hardening occurs in the initial stage of such rolling and the equivalent stress $\sigma_{eq}$ increases quickly, it will be easy to suppress the propagation of cracks. Even in a case where the same equivalent stress $\sigma_{eq}$ is ultimately reached, unless work hardening is performed promptly, cracks may propagate prior to work hardening, and consequently it may not necessarily always be possible to suppress the propagation of cracks. In other words, it is not necessarily always the case that propagation of cracks can be suppressed simply because the equivalent stress $\sigma_{eq}$ is high. Note that, in a case where $\sigma_0$ is high, because the strength is sufficiently high even without causing plastic deformation, it is easy to suppress the propagation of cracks.

The present inventors conducted further studies regarding values of $\sigma_0$ (elastic limit), C (initial kinematic hardening coefficient), and $\gamma$ (kinematic hardening coefficient reduction ratio) that can suppress the propagation of cracks. The present inventors conducted an analysis by the finite element method (FEM) to investigate how the propagation rate of a crack changes when the properties of the material of a railway wheel were changed.

[FEM Analysis Method]

The FEM analysis was carried out by the following method. An elastoplastic FEM analysis was conducted using ABAQUS Ver. 6.14 (Dassault Systemes K.K.). The FEM analysis model is shown in FIG. 1. A two-dimensional plane strain model was adopted as the model, with a railway wheel test specimen model being a plane, and a rail test specimen model being a circle. An 8-node quadratic element was used for the railway wheel test specimen model, and a 4-node linear element was used for the rail test specimen model. The diameter of the rail test specimen model was 75 mm. The minimum element dimensions of the railway wheel test specimen model were 0.1 mm in width and 0.1 mm in length at a contact portion with the rail test specimen model and in the vicinity thereof, excluding a crack introduction portion that is described later. In the railway wheel test specimen model, a region with a width of 25 mm and a length of 2 mm including the contact portion with the rail test specimen model was taken as a finite element, and a region other than the aforementioned region was taken as an infinite element. In the FEM analysis, in order to simulate rolling contact, a pressing load and forced displacement of movement in the rotational direction and the horizontal direction were applied to the rail test specimen model. Three cracks which were inclined with respect to the surface of the railway wheel test specimen model were introduced into the railway wheel test specimen model. The reason for introducing the three cracks was to simulate the occurrence of a number of cracks in the surface of a railway wheel. Crack propagation evaluation was carried out on a crack located at the center of the three cracks. Hereinafter, the crack located at the center of the three cracks will also be referred to simply as the "central crack". The angle of the cracks with respect to the surface of the railway wheel test specimen model was made 25°. The depth of the introduced cracks was made 0.8 mm, and the interval between the three cracks was made 1.72 mm. The element dimensions of the crack tip of the central crack were made 0.08 mm in width and 0.08 mm in length. The number of nodes of the railway wheel test specimen model was set to 16,542, and the number of elements was set to 5,488. The number of nodes of the rail test specimen model was set to 4,250, and the number of elements was set to 4,096. In the FEM analysis, penetration of water into the interior of the crack under water lubrication was simulated. Specifically, an incompressible hydrostatic pressure element filling a closed space formed by the crack and the surface of the rail specimen model was defined. Further, contact was defined on the crack surface.

In the FEM analysis, a rolling contact load was reproduced by the following procedure. (1) The rail test specimen model was arranged at a position 7.5 mm away from the central crack. (2) A pressing load (Hertzian stress) was applied to an MPC node arranged at the center of the rail test specimen model. (3) While maintaining the pressing load constant, a rotation and a forced displacement of movement in the horizontal direction were applied to the multi-point constraint (MPC) node to cause the rail test specimen model to roll on the railway wheel test specimen model. At such time, slippage was applied by deviating the amount of movement due to rotation and the forced displacement amount of the movement in the horizontal direction. The amount of movement due to rotation was made 15 mm in total. (4) In a state in which the rail test specimen model was separated by 0.09 mm from the railway wheel test specimen model, the rail test specimen model was caused to move to the initial position. Five cycles were calculated, with the above procedures (1) to (4) taken as one cycle. The amount of water penetrating into the crack was determined based on the volume of a closed space generated by contact between the railway wheel test specimen model and the rail test specimen model in the second cycle. The fluid enclosed in the second cycle was calculated up to the fifth cycle on the assumption that the volume did not change thereafter.

[Method for Calculating Driving Force for Crack Propagation]

Based on the FEM analysis result, the stress intensity factor was calculated to determine the driving force for crack propagation. Specifically, a stress intensity factor $K_I$ (MPa$\sqrt{m}$) of the open type (mode I) and a stress intensity factor $K_{II}$ (MPa$\sqrt{m}$) of the shear type (mode II) were calculated using Formula (6). A crack opening displacement obtained by FEM analysis in a local coordinate system in which the tip of the central crack introduced into the railway wheel test specimen model was taken as the origin was used in order to calculate the stress intensity factors.

[Expression 6]

$$K_I = \frac{E}{4(1-\nu^2)}\sqrt{\frac{2\pi}{r}}u_y,\; K_{II} = \frac{E}{4(1-\nu^2)}\sqrt{\frac{2\pi}{r}}u_x \quad (6)$$

In the formula, E: Young's modulus (206 GPa), v: Poisson's ratio (0.3), r: distance from crack tip (m), $U_y$: ½ of crack opening displacement in direction perpendicular to crack surface (m), and $U_x$: ½ of crack opening displacement in direction parallel to crack surface (m).

The relation between $U_x$, $U_y$, and the square root r obtained by the FEM analysis was linearly approximated. $K_I$ and $K_{II}$ were determined based on the value of the obtained slope and Formula (2). The range of r resulting from the linear approximation was 0 to 0.12 mm at $K_I$ with a Hertzian stress of 1500 MPa. The propagation of a rolling contact fatigue crack is so-called "mixed mode" propagation in which open-type (mode I) crack propagation and shear-type (mode II) crack propagation occur simultaneously due to compressive stress and shear stress. Therefore, in order to evaluate mixed-mode crack propagation, a crack propagation angle $\theta_\sigma$ at the time of a stress intensity factor $K_{\theta,max}$ was determined using the mixed mode criterion of Erdogan and Sih shown in Formula (7). The above calculations were performed using the analysis results of the fifth cycle, when the values were stable.

[Expression 7]

$$K_{\theta,max} = \cos\left(\frac{\theta_\sigma}{2}\right)\left\{K_I\cos^2\left(\frac{\theta_\sigma}{2}\right) - \frac{3}{2}K_{II}\sin\theta_\sigma\right\}, \quad (7)$$

$$\cos\theta_\sigma = \frac{3K_{II}^2 \pm K_I\sqrt{K_I^2 + 8K_{II}^2}}{K_I^2 + 9K_{II}^2}$$

In the formula, $\theta_\sigma$ is the angle of maximum tangential stress on a circumference centered on the crack tip, with $\theta_\sigma$ being <0 when $K_{II}$>0, and $\theta_\sigma$ being >0 when $K_{II}$<0.

Table 1 shows fatigue crack propagation rates based on Paris' law in a case where the elastic limit $\sigma_0$, the initial kinematic hardening coefficient C, and the kinematic hardening coefficient reduction ratio $\gamma$ were varied in the aforementioned FEM analysis.

TABLE 1

| Test Number | $\sigma_0$ (MPa) | C (GPa) | $\gamma$ | da/dN (mm/cycle) |
|---|---|---|---|---|
| 1 | 482 | 120 | 300 | $8.75 \times 10^{-3}$ |
| 2 | 480 | 176 | 331 | $2.84 \times 10^{-3}$ |
| 3 | 480 | 257 | 365 | $8.88 \times 10^{-4}$ |
| 4 | 580 | 176 | 331 | $1.73 \times 10^{-3}$ |
| 5 | 680 | 176 | 331 | $9.52 \times 10^{-4}$ |
| 6 | 780 | 176 | 331 | $5.51 \times 10^{-4}$ |

The fatigue crack propagation rate shown in the column "da/dN (mm/cycle)" in Table 1 was determined based on Formula (8).

[Expression 8]

$$\frac{da}{dN} = C(\Delta K)^m = C(\Delta K_{\theta,max})^m \quad (8)$$

In the formula, da/dN: crack propagation rate (mm/cycle), and $\Delta K_{\theta,max}$: fluctuation range of stress intensity factor (MPa√m). Further, C and m are constants obtained through experiment ($C=3.93\times10^{-13}$, m=3.68). A higher value of da/dN indicates a greater degree of ease for cracks to propagate. Test No. 1 is a material corresponding to Class-C (tread) that is the standard of the Association of American Railroads (AAR). Test No. 2 is a material corresponding to a wheel (tread) produced by the production method of the present application. Test Nos. 3 to 6 are virtually set materials with even higher strength than Test No. 2. Test Nos. 4 to 6 in Table 1 are test numbers for which the conditions other than the elastic limit Co were the same. Comparing Test Nos. 4 to 6, it is found that da/dN decreases as the strength of the material increases. It was found that when the elastic limit go is, for example, 430 MPa or more, there is a possibility of obtaining a crack propagation suppressing effect that is equivalent to or greater than that of the existing Class-C.

Figure 4:
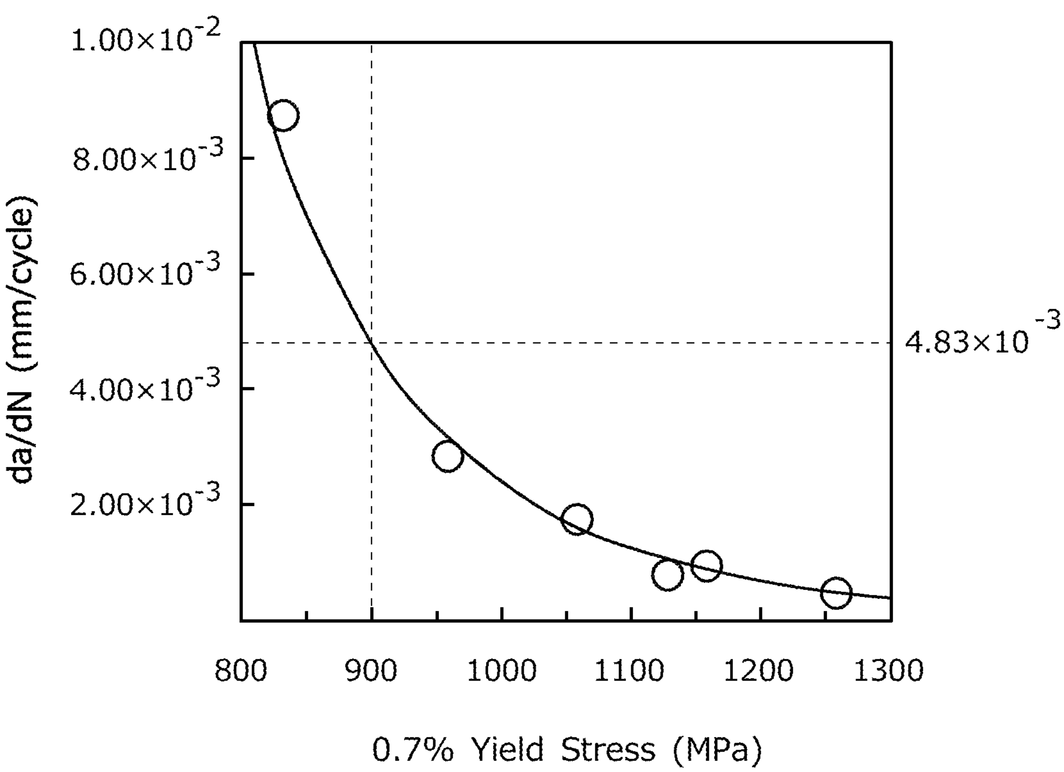
FIG. 4 is a graph illustrating the relation between a crack propagation rate da/dN and 0.7% yield stress in a cyclic stress-strain curve.

On the other hand, the present inventors conducted further detailed studies regarding $\Delta K_{\theta,max}$ that is the driving force for crack propagation. As a result, it was revealed that there is a strong negative correlation between $\Delta K_{\theta,max}$ that is the driving force for crack propagation, and the equivalent stress $\sigma_{eq}$ when $\varepsilon_{peq}$=0.007 is substituted into Formula (2) of the nonlinear kinematic hardening law. That is, it was found that there is a strong negative correlation between $\Delta K_{\theta,max}$ that is the driving force for crack propagation, and 0.7% yield stress in the cyclic stress-strain curve. Therefore, the present inventors investigated the relationship between the crack propagation rate da/dN and the 0.7% yield stress in the cyclic stress-strain curve. FIG. 4 is a graph illustrating the relation between the crack propagation rate da/dN and the 0.7% yield stress in the cyclic stress-strain curve. The abscissa in FIG. 4 represents the 0.7% yield stress (MPa) in the cyclic stress-strain curve. The ordinate in FIG. 4 represents the crack propagation rate da/dN (mm/cycle). Referring to FIG. 4, as the 0.7% yield stress in the cyclic stress-strain curve increases, the crack propagation rate da/dN decreases exponentially. In particular, if the 0.7% yield stress in the cyclic stress-strain curve is 900 MPa or more, the crack propagation rate da/dN (mm/cycle) will be $4.83\times10^{-3}$ or less. That is, it is considered that if the 0.7% yield stress in the cyclic stress-strain curve is 900 MPa or more, since the crack propagation rate will be approximately half or less in comparison to Class-C, the rolling contact fatigue life will be significantly extended.

Referring to Table 1 and FIG. 4, it was found that, on the precondition that the elastic limit $\sigma_0$ is 430 MPa or more, the initial kinematic hardening coefficient C is 130 GPa or more, and the kinematic hardening coefficient reduction ratio $\gamma$ is 400 or less, if the initial kinematic hardening coefficient C and the kinematic hardening coefficient reduction ratio $\gamma$ satisfy Formula (1), it is possible to significantly suppress crack propagation in comparison to the existing Class-C. Formula (1) is obtained by substituting $\varepsilon_{peq}$=0.007 and $\sigma_{eq}$=900 into Formula (2) of the nonlinear kinematic hardening law, and is the equivalent stress value at an equivalent plastic strain amount of 0.7%. That is, Formula (1) shows the range of the initial kinematic hardening coefficient C and the kinematic hardening coefficient reduction ratio $\gamma$ for which the 0.7% yield stress in the cyclic stress-strain curve is 900 MPa or more.

[Expression 9]

$$470 \le \frac{C}{\gamma}\{1 - \exp(-0.007\gamma)\} \quad (1)$$

A railway wheel 100 of the present embodiment that has been completed based on the above findings has the following configuration.

[1]

A railway wheel, including:

a hub part that forms an inner circumferential portion of the railway wheel, and that has a through hole for inserting an axle of a railway vehicle;

a rim part that forms an outer circumferential portion of the railway wheel, and that includes a tread to come into contact with a top surface of a rail on which the railway vehicle travels, and a flange protruding outward from the tread in a radial direction of the railway wheel; and an annular web part that connects the hub part and the rim part;

wherein:

in an outer layer of the rim part that includes the tread, an elastic limit $\sigma_0$ is 430 MPa or more, an initial kinematic hardening coefficient C is 130 GPa or more, and a kinematic hardening coefficient reduction ratio $\gamma$ is 400 or less, where, the initial kinematic hardening coefficient C and the kinematic hardening coefficient reduction ratio $\gamma$ satisfy Formula (1).

[Expression 10]

$$470 \leq \frac{C}{\gamma}\{1 - \exp(-0.007\gamma)\} \quad (1)$$

In the railway wheel of the present embodiment, in the outer layer of the rim part that includes the tread, an elastic limit $\sigma_0$ is 430 MPa or more, an initial kinematic hardening coefficient C is 130 GPa or more, a kinematic hardening coefficient reduction ratio $\gamma$ is 400 or less, and the initial kinematic hardening coefficient C and the kinematic hardening coefficient reduction ratio $\gamma$ satisfy Formula (1). Therefore, the propagation of cracks can be suppressed.

[2]

A wheelset for railway vehicles, including:

a first railway wheel and a second railway wheel, the railway wheels each being according to [1], and the axle that is inserted into the through hole of the first railway wheel and the second railway wheel, and that extends in a rotational axis direction of the first railway wheel and the second railway wheel.

The wheelset for railway vehicles of the present embodiment is equipped with the railway wheels described in [1]. Therefore, the propagation of cracks in the railway wheels can be suppressed.

[Structure of Railway Wheel]

Figure 2:
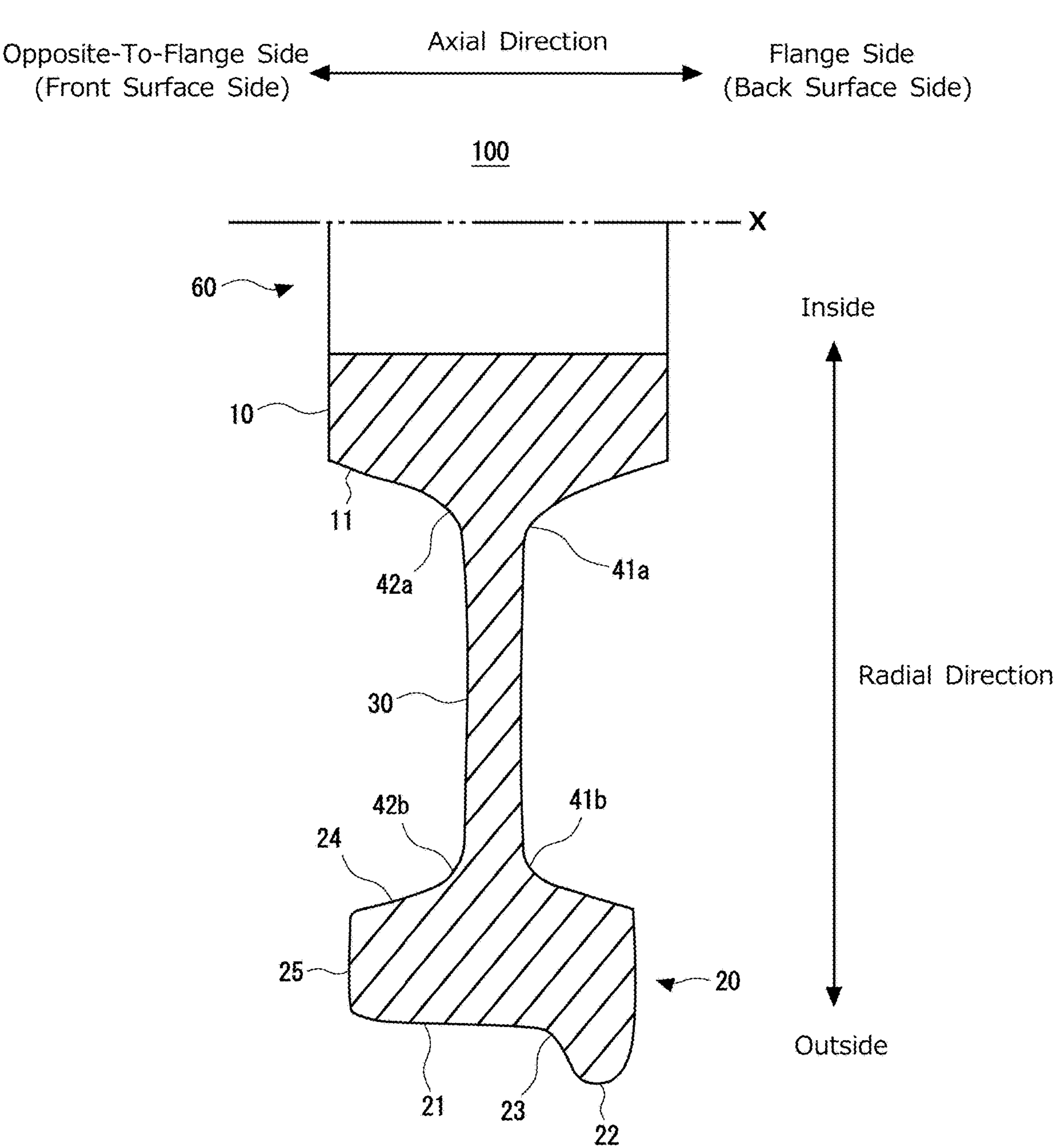
FIG. 2 is a longitudinal section of a railway wheel of the present embodiment.

FIG. 2 is a longitudinal section of the railway wheel 100 of the present embodiment. The longitudinal section refers to a cross section obtained by cutting the railway wheel 100 along a plane including a central axis X of the railway wheel 100. The longitudinal section of the railway wheel 100 is symmetric about the central axis X, and therefore FIG. 2 illustrates the railway wheel 100 on one side of the central axis X only. In the present embodiment, the direction in which the central axis X of the railway wheel 100 extends is referred to as "axial direction", and the radial direction of the railway wheel 100 is referred to simply as "radial direction".

Referring to FIG. 2, the railway wheel 100 includes a hub part 10, a rim part 20, and a web part 30.

The hub part 10 is a cylindrical shape that has the central axis X as an axial centerline, and forms an inner circumferential portion of the wheel 100. An axle (not illustrated) of a railway vehicle is to be inserted into the hub part 10.

The rim part 20 is a cylindrical shape that has the central axis X as an axial centerline, and forms an outer circumferential portion of the railway wheel 100. The rim part 20 is disposed on the outer side relative to the hub part 10 in the radial direction.

The rim part 20 includes a tread 21 and a flange 22. The tread 21 is provided on the outer peripheral surface of the railway wheel 100. That is, the tread 21 is an annular surface that faces outward in the radial direction. The tread 21 is to come into contact with the top surface of a rail on which the railway vehicle travels. The diameter of the tread 21 gradually increases toward the flange 22 side. The shape of the tread 21 is not particularly limited. For example, when the railway wheel 100 is viewed in longitudinal section, the tread 21 may be conical in shape or may be arcuate in shape.

The flange 22 is adjacent to the tread 21 in the axial direction. The flange 22 is provided at one end of the rim part 20 in the axial direction. In the present embodiment, the side on which the flange 22 is located in the axial direction is referred to as "flange side", and the opposite side thereto is referred to as "opposite-to-flange side". In other words, the front surface side of the railway wheel 100 is the opposite-to-flange side, and the back surface side of the railway wheel 100 is the flange side. The flange 22 protrudes outward from the tread 21 in the radial direction. When the railway vehicle travels on right and left rails, the flange 22 is positioned on the inward side of the respective rails.

The surface of the flange 22 is connected to the tread 21. A connecting portion between the surface of the flange 22 and the tread 21 is referred to as a throat 23. When the railway wheel 100 is viewed in longitudinal section, the throat 23 is a curve that includes one or more types of arcs, and smoothly connects the surface of the flange 22 to the tread 21.

The web part 30 has an annular shape, and connects the hub part 10 on the inner circumferential side and the rim part 20 on the outer circumferential side. The plate thickness of the web part 30 is smaller as a whole than the length in the axial direction of the hub part 10 (hub width) and the length in the axial direction of the rim part 20 (rim width). The web part 30 has a front surface on the opposite-to-flange side, and has a back surface on the flange side. The inner circumferential ends of the front surface and the back surface are connected to an outer peripheral surface 11 of the hub part 10 through connecting portions 41*a* and 42*a* which are arc-shaped as seen in longitudinal section, respectively. The outer circumferential ends of the front surface and the back surface are connected to an inner peripheral surface 24 of the rim part 20 through connecting portions 41*b* and 42*b* which are arc-shaped as seen in longitudinal section, respectively.

The railway wheel 100 satisfies the aforementioned parameters at an outer layer of the rim part including the tread 21. The term "outer layer of the rim part" refers to an area from the tread 21 to a depth of 15 mm in the radial direction of the railway wheel 100. When the outer layer of the rim part satisfies the aforementioned parameters, the propagation of cracks in the railway wheel 100 can be suppressed.

Figure 3:
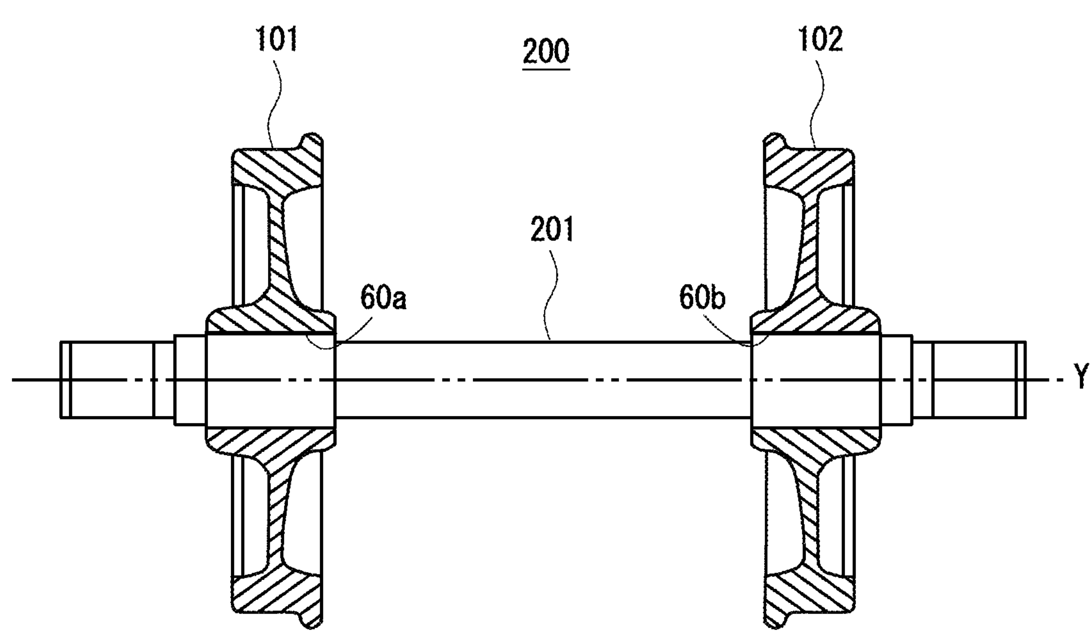
FIG. 3 is a longitudinal section of a wheelset for railway vehicles of the present embodiment.

FIG. 3 is a longitudinal section of a wheelset for railway vehicles 200 of the present embodiment. The longitudinal section refers to a cross section obtained by cutting the wheelset for railway vehicles 200 along a plane including a central axis Y of the wheelset for railway vehicles 200. Referring to FIG. 3, the wheelset for railway vehicles 200 includes a first railway wheel 101 and a second railway wheel 102, and an axle 201. The first railway wheel 101 and the second railway wheel 102 are each the aforementioned railway wheel 100. The axle 201 is inserted into through holes 60*a* and 60*b* of the first railway wheel 101 and the second railway wheel 102. The axle 201 extends in the rotational axis direction of the first railway wheel 101 and the second railway wheel 102.

[Elastic Limit]

In the outer layer of the rim part 20 including the tread 21, an elastic limit $\sigma_0$ is 430 MPa or more. A preferable lower limit of the elastic limit $\sigma_0$ is 440 MPa, and more preferably is 450 MPa. Although not particularly limited, the upper limit of the elastic limit Co is, for example, 900 MPa.

[Initial Kinematic Hardening Coefficient]

In the outer layer of the rim part 20 including the tread 21, an initial kinematic hardening coefficient C is 130 GPa or more. A preferable lower limit of the initial kinematic hardening coefficient C is 135 GPa, more preferably is 140 GPa, further preferably is 145 GPa, further preferably is 150 GPa, further preferably is 155 GPa, and further preferably is 160 GPa. Although not particularly limited, the upper limit of the initial kinematic hardening coefficient C is, for example, 200 GPa.

[Kinematic Hardening Coefficient Reduction Ratio]

In the outer layer of the rim part 20 including the tread 21, a kinematic hardening coefficient reduction ratio $\gamma$ is 400 or less. A preferable upper limit of the kinematic hardening coefficient reduction ratio $\gamma$ is 390, more preferably is 380, further preferably is 370, further preferably is 360, and further preferably is 350. Although not particularly limited, the lower limit of the kinematic hardening coefficient reduction ratio $\gamma$ is, for example, 200.

[Method for Measuring Elastic Limit, Initial Kinematic Hardening Coefficient, and Kinematic Hardening Coefficient Reduction Ratio]

The elastic limit $\sigma_0$, the initial kinematic hardening coefficient C, and the kinematic hardening coefficient reduction ratio $\gamma$ of the railway wheel 100 are measured by the following method. First, a cyclic compression-tension test is conducted to acquire a cyclic nominal stress-nominal strain curve. The acquired nominal stress-nominal strain curve is rewritten into a true stress-true strain curve. In addition, plastic strain in the true strain is calculated by subtracting elastic strain from the true strain. The plastic strain in the true strain corresponds to equivalent plastic strain, and the true stress at this time corresponds to equivalent stress. The elastic limit $\sigma_0$, the initial kinematic hardening coefficient C, and the kinematic hardening coefficient reduction ratio $\gamma$ are determined by fitting the equivalent stress-equivalent plastic strain curve obtained in this manner to Formula (2) of the nonlinear kinematic hardening law. Further, the 0.7% yield stress in the cyclic stress-strain curve is the equivalent stress $\sigma_{eq}$ when the equivalent plastic strain $\varepsilon_{peq}$=0.007 is substituted into Formula (2) of the nonlinear kinematic hardening law obtained by the aforementioned fitting.

[Cyclic Compression-Tension Test]

Figure 7:
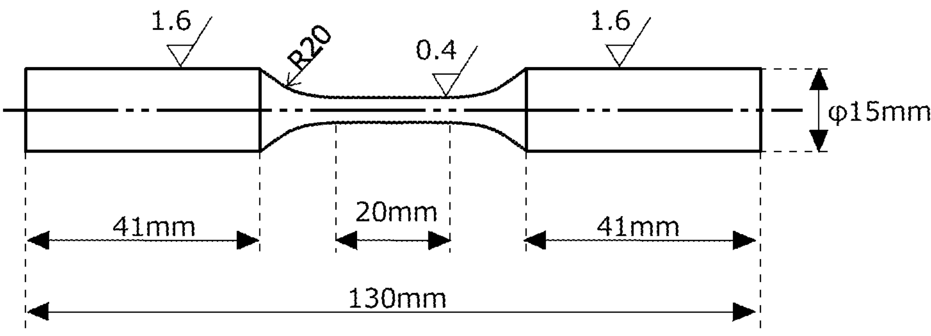
FIG. 7 is a schematic diagram illustrating a test specimen for a cyclic compression-tension test.

The cyclic compression-tension test is performed as follows. A cylindrical test specimen is taken from the outer layer of the rim part 20 of the railway wheel 100 in a manner so that the longitudinal direction of the test specimen is in the circumferential direction of the railway wheel 100. FIG. 7 is a schematic diagram illustrating a test specimen for the cyclic compression-tension test. The test specimen has a cylindrical shape with a maximum diameter of 15 mm, and the length of a parallel portion at the center in the longitudinal direction is 20 mm. The center of a cross section perpendicular to the longitudinal direction of the test specimen is taken as a position at a depth of 7.5 mm in the radial direction of the railway wheel 100 from the tread 21 of the railway wheel 100. The cyclic compression-tension test is conducted using the taken test specimen. The test is conducted using an incremental step method with a strain ratio of −1 and a strain rate of 0.04%/sec. The strain variation range is to be 0.2%. The maximum amplitude of strain is to be 1.0%. Further, the test is to be cut off at 20 cycles. The cyclic nominal stress-nominal strain curve is to be taken as the first quadrant of a curve connecting the peaks of the hysteresis curve of the $20^{th}$ cycle. The elastic limit $\sigma_0$, the initial kinematic hardening coefficient C, and the kinematic hardening coefficient reduction ratio $\gamma$ are determined by the method described above from the thus-obtained cyclic nominal stress-nominal strain curve.

The chemical composition of the railway wheel 100 is not particularly limited. The chemical composition of the railway wheel 100 may be, for example, a chemical composition consisting of, in mass %, C: more than 0.70 to 1.35%, Si: 1.00% or less, Mn: 0.10 to 1.50%, P: 0 to 0.050%, S: 0 to 0.030%, N: 0.0200% or less, Al: 0 to 1.500%, Cu: 0 to 0.50%, Ni: 0 to 0.50%, Cr: 0 to 0.50%, V: 0 to 0.12%, Ti: 0 to 0.010%, Mo: 0 to 0.20%, and Nb: 0 to 0.050%, with the balance being Fe and impurities. The microstructure of the railway wheel 100 is not particularly limited. The microstructure of the railway wheel 100 may be, for example, a microstructure in which the total of the area fractions of one or more kinds selected from the group consisting of pro-eutectoid cementite, pro-eutectoid ferrite, bainite, and martensite is 0 to 25%, and the balance is pearlite.

The area fraction of pearlite is determined by the following method. A sample is taken from a central position in the thickness direction of the rim part 20 of the railway wheel 100, a central position in the thickness direction of the web part 30, and a central position in the thickness direction of the hub part 10, respectively. The observation surface of each sample is mirror-finished by mechanical polishing. Thereafter, the observation surface is etched using a nital solution (mixed solution of nitric acid and ethanol). A photographic image is generated using an optical microscope with a magnification of ×500 for an arbitrary one visual field (200 μm×200 μm) within the observation surface after etching. The contrast of pearlite is different from the contrast of the quenched layer (martensite and/or bainite), pro-eutectoid cementite, and pro-eutectoid ferrite. Therefore, the quenched layer and the pearlite in the observation surface are identified based on the contrast. The area fraction of pearlite is determined based on the total area of pearlite that is identified and the area of the observation surface.

[Method for Producing Railway Wheel]

One example of a method for producing the aforementioned railway wheel 100 will now be described. The present production method includes a starting material production process, a forming process, a heat treatment process, and a cutting process. Each process is described hereunder.

[Starting Material Production Process]

In the starting material production process, after molten steel having the chemical composition described above is melted using an electric furnace, a converter, or the like, the molten steel is cast to obtain a cast material (a cast piece or an ingot). A cast piece may be produced by continuous casting, or an ingot may be produced by casting with a mold.

The cast piece or the ingot is subjected to hot working to produce a starting material of a desired size. The hot working is, for example, hot forging or hot rolling. In a case of producing the starting material by hot rolling, for example, the starting material is produced by a following method. In the hot rolling, for example, a blooming mill is used. The cast material is subjected to blooming by the blooming mill to produce the starting material. In a case where a continuous mill is installed downstream of the blooming mill, the steel material after blooming may be further subjected to hot rolling using the continuous mill to produce the starting material of an even smaller size. In the continuous mill, a horizontal stand having a pair of horizontal rolls, and a vertical stand having a pair of vertical rolls are alternately arranged in a row. Although not particularly limited, the heating temperature of the reheating furnace in the hot rolling is, for example, 1100 to 1350° C. The starting material is produced by the foregoing production process.

Note that, the starting material may be a cast material (a cast piece or an ingot). That is, the hot working described above may be omitted. The starting material of the railway wheel 100 is produced by the processes described above. The starting material is, for example, a starting material that has a cylindrical shape.

[Forming Process]

In the forming process, the prepared starting material is used to form an intermediate product having a wheel shape by hot working. Because the intermediate product has a wheel shape, the intermediate product includes the hub part 10, the web part 30, and the rim part 20 including the tread 21 and the flange 22. The hot working is, for example, hot forging.

A preferable heating temperature of the starting material during hot working is 1220° C. or more. A method for cooling the intermediate product after the hot working is not particularly limited. The intermediate product may be allowed to cool or may be water-cooled.

[Heat Treatment Process]

In the heat treatment process, the formed intermediate product having a wheel shape is subjected to tread quenching. Specifically, the intermediate product after the forming process (hot forging or hot rolling) is reheated to the $A_{cm}$ transformation point or higher (reheating treatment). After heating, the tread 21 and the flange 22 of the intermediate product are subjected to rapid cooling (tread quenching). For example, the tread 21 and the flange 22 are rapidly cooled by spraying a cooling medium. The cooling medium is, for example, air, mist, or spray. Note that, when performing the tread quenching, the web part 30 and the hub part 10 are allowed to cool without being water-cooled.

Figure 5:
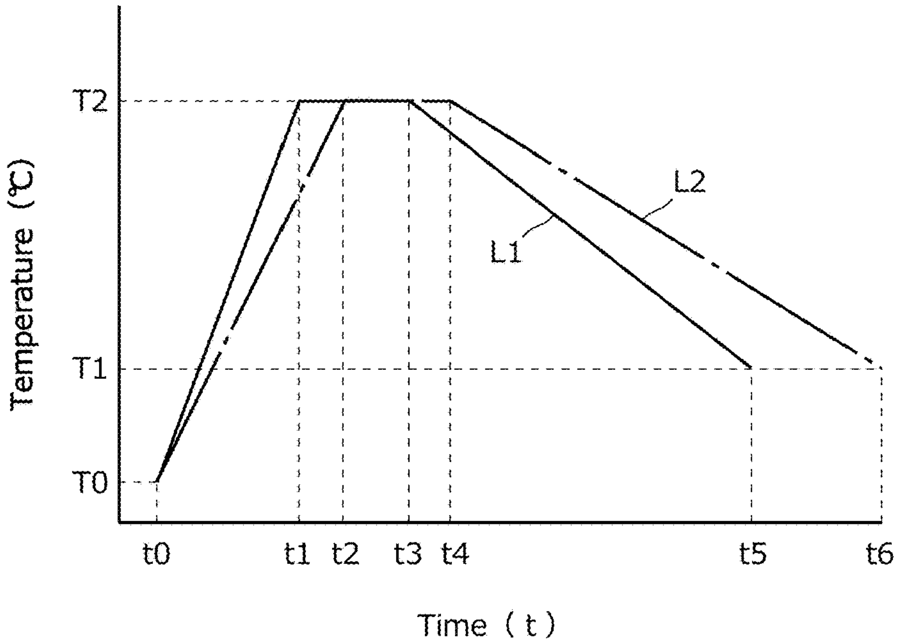
FIG. 5 is a diagram illustrating heat patterns at a tread and at a position at a depth of 15 mm from the tread in a case where one-stage cooling was performed.

Cooling in which the cooling rate during tread quenching is kept constant is referred to here as "one-stage cooling". FIG. 5 is a diagram illustrating heat patterns at the tread 21 and at a position at a depth of 15 mm from the tread 21 in a case where one-stage cooling is performed. Hereinafter, the position at a depth of 15 mm from the tread 21 is also referred to simply as "15-mm depth position". Here, the term "15-mm depth" means a depth of 15 mm from the tread 21 in the radial direction of the railway wheel 100. In FIG. 5, the heat pattern of the tread 21 is shown as a solid line L1. The heat pattern at the 15-mm depth position from the tread 21 is shown as a dashed line L2.

In a case where one-stage cooling is performed, the tread 21 is heated from a heating start temperature T0 to a reheating temperature T2 in a time period from a time t0 to a time t1. Thereafter, the tread 21 is held at the reheating temperature T2 from the time t1 to a time t3. Next, the tread 21 is cooled from the reheating temperature T2 to a cooling temperature T1 in a time period from the time t3 to a time t5. On the other hand, at the 15-mm depth position, more time is required for heating and cooling in comparison to the tread 21. At the 15-mm depth position, heating from the heating start temperature T0 to the reheating temperature T2 is performed in a time period from the time to t0 a time t2. Thereafter, the 15-mm depth position is held at the reheating temperature T2 from the time t2 to a time t4. Next, the 15-mm depth position is cooled from the reheating temperature T2 to the cooling temperature T1 in a time period from the time t4 to a time t6.

A cooling rate S1 at the tread 21 can be expressed as (T2−T1)/(t5−t3). On the other hand, a cooling rate S2 at the 15-mm depth position can be expressed as (T2−T1)/(t6−t4). The difference between t6 and t4 is greater than the difference between t5 and t3. That is, in the case of one-stage cooling, the cooling rate is slower at the 15-mm depth position than at the tread 21.

Figure 6:
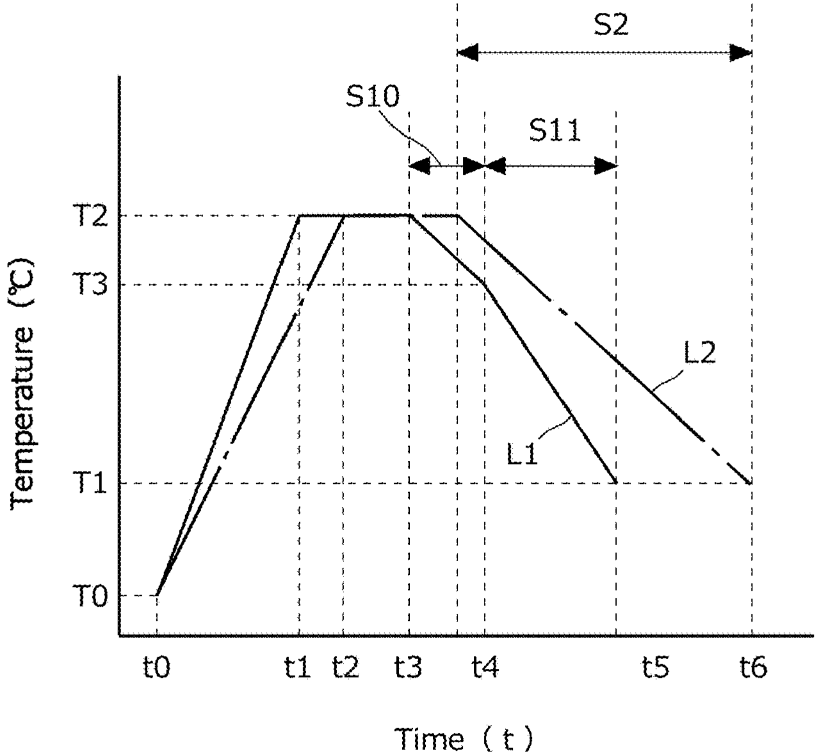
FIG. 6 is a diagram illustrating heat patterns at a tread and at a position at a depth of 15 mm from the tread in a case where two-stage cooling was performed.

For example, by performing two-stage cooling, the cooling rate at the 15-mm depth position can be increased. By this means, the elastic limit $\sigma_0$, the initial kinematic hardening coefficient C, and the kinematic hardening coefficient reduction ratio $\gamma$ at the 15-mm depth position can be controlled. FIG. 6 is a diagram illustrating heat patterns at the tread 21 and at a position at a depth of 15 mm from the tread 21 in a case where two-stage cooling is performed. In FIG. 6, the heat pattern of the tread 21 is shown as the solid line L1. The heat pattern at the position at a depth of 15 mm from the tread 21 is shown as the dashed line L2.

In a case where two-stage cooling is performed, the tread 21 is heated from a heating start temperature T0 to a reheating temperature T2 in a time period from a time t0 to a time t1. Thereafter, the temperature of the tread 21 is held at the reheating temperature T2 from the time t1 to a time t3. Next, the tread 21 is cooled from the reheating temperature T2 to a first cooling temperature T3 in a time period from the time t3 to a time t4. In addition, the tread 21 is cooled from the first cooling temperature T3 to a second cooling temperature T1 in a time period from the time t4 to a time t5. The cooling rate from the reheating temperature T2 to the first cooling temperature T3 will be referred to as "first cooling rate S10". The cooling rate from the first cooling temperature T3 to the second cooling temperature T1 will be referred to as "second cooling rate S11". The second cooling rate S11 is made higher than the first cooling rate S10. For example, the first cooling rate S10 from a reheating temperature of 900 to 1000° C. to a first cooling temperature of 500 to 550° C. is set to 0.700 to 10.00° C./sec. The second cooling rate S11 from the first cooling temperature to a second cooling temperature of 300 to 400° C. is set to 1.40 to 25.0° C./sec. In this case, fine pearlite precipitates in the tread 21 cooled at the first cooling rate S10. At a stage when the change in structure of the tread 21 has decreased, cooling at the second cooling rate S11 is performed. The second cooling rate S11 is higher than the first cooling rate S10. By this means, the cooling rate S2 at the 15-mm depth position can be increased, and the elastic limit $\sigma_0$, the initial kinematic hardening coefficient C, and the kinematic hardening coefficient reduction ratio $\gamma$ at the 15-mm depth position can be controlled.

If the first cooling rate S10 is too high, a quenched layer (martensite) will excessively form. The quenched layer is removed in a cutting process to be described later. If the quenched layer is excessively formed, the yield will decrease. Therefore, the first cooling rate S10 is set to a cooling rate of 0.700 to 10.00° C./sec that can suppress excessive formation of a quenched layer and can induce fine pearlite to precipitate in the tread 21. The subsequent second cooling rate S11 is set to 1.40 to 25.0° C./sec in order to increase the cooling rate S2 at the 15-mm depth position.

The second cooling rate S11 is preferably a cooling rate that is multiple of 2 to 2.5 times the first cooling rate S10.

For example, by rapidly cooling the tread 21 and the flange 22 of the intermediate product under the above conditions, the railway wheel 100 is obtained in which, in the outer layer of the rim part that includes the tread 21, the elastic limit Go is 430 MPa or more, the initial kinematic hardening coefficient C is 130 GPa or more, the kinematic hardening coefficient reduction ratio $\gamma$ is 400 or less, and the initial kinematic hardening coefficient C and the kinematic hardening coefficient reduction ratio $\gamma$ satisfy Formula (1).

Although in the above description the intermediate product is reheated, the intermediate product after the hot working may be directly subjected to the tread quenching (without being reheated).

The intermediate product after the tread quenching is subjected to tempering as necessary. It is sufficient if the tempering is performed at a well-known temperature for a well-known time. The tempering temperature is, for example, 400 to 600° C.

[Cutting Process]

As described above, although fine pearlite is formed in the outer layer of the tread 21 of the intermediate product after the heat treatment, a quenched layer is formed in the layer thereabove. Because the wear resistance of the quenched layer is low with respect to the use of the railway wheel 100, the quenched layer is removed by cutting. It is sufficient to perform the cutting by a well-known method.

The railway wheel 100 of the present embodiment is produced by the above processes.

[Method for Producing Wheelset]

One example of a method for producing the wheelset for railway vehicles 200 according to the present embodiment will be described. The present production method includes an axle production process. The axle production process includes a crude product production process, and a heat treatment process.

[Crude Product Production Process]

A molten steel is produced. The chemical composition of the molten steel is, for example, a chemical composition consisting of C: 0.45 to 0.59%, Si: 0.15% or more, P: 0 to 0.045%, S: 0 to 0.050%, and V: 0.02 to 0.08%, with the balance being Fe and impurities. An ingot is produced using the molten steel. Hot forging is performed on the ingot to produce a crude product having an axle shape. It suffices that the heating temperature of the ingot during hot forging is within a well-known temperature range. The heating temperature is, for example, 1000 to 1300° C. The produced crude product is subjected to quenching and tempering, or a normalizing treatment.

[Heat Treatment Process]

In the case of performing quenching and tempering, it suffices that the upper limits adopted for the quenching and tempering are well-known conditions. Specifically, in the quenching, the quenching temperature is set to an $A_{c3}$ transformation point or more. The crude product is held at the quenching temperature, and thereafter is rapidly cooled by water cooling or oil cooling. In the tempering, the tempering temperature is set to an $A_{c1}$ transformation point or less. The crude product is held at the tempering temperature, and thereafter is allowed to cool. In the case of performing a normalizing treatment, the crude product is held at a heat treatment temperature that is higher than the $A_{c1}$ transformation point, and thereafter is allowed to cool. Note that, tempering may be performed following the normalizing treatment.

The crude product that underwent the quenching and tempering, or the normalizing treatment is, as necessary, subjected to machining. Thereafter, the crude product is subjected to an induction quenching treatment. In the induction quenching treatment, a near-surface portion of the crude product is heated to a temperature higher than the $A_{c3}$ transformation point by high-frequency heating, and thereafter is rapidly cooled. The rapid cooling method is, for example, water cooling. As necessary, the crude product that underwent the induction quenching may be subjected to final machining. That is, machining is an optional treatment process. Note that, in the case of performing machining, the machining (lathe turning and polishing) is performed within a range in which a quench-hardened layer having a required depth can be ensured.

The axle 201 of the present embodiment is produced by the above production method.

The axle 201 is press-fitted into the through holes of the produced railway wheels 100 to thereby produce the wheelset for railway vehicles 200 of the present embodiment.

EXAMPLE

Test specimens were prepared under conditions of various cooling rates and various values with respect to the elastic limit $\sigma_0$, the initial kinematic hardening coefficient C, and the kinematic hardening coefficient reduction ratio $\gamma$. A cyclic compression-tension test was performed using the test specimens.

Molten steel having a chemical composition consisting of C: more than 0.70 to 1.35%, Si: 1.00% or less, Mn: 0.10 to 1.50%, P: 0 to 0.050%, S: 0 to 0.030%, N: 0.0200% or less, Al: 0 to 1.500%, Cu: 0 to 0.50%, Ni: 0 to 0.50%, Cr: 0 to 0.50%, V: 0 to 0.12%, Ti: 0 to 0.010%, Mo: 0 to 0.20%, and Nb: 0 to 0.050%, with the balance being Fe and impurities was produced. The molten steel was cast into a mold with a diameter of 513 mm to produce ingots, and each ingot was cut to a length of 300 mm. Each of the cut ingots was heated to 1200° C., and thereafter subjected to hot forging to produce a wheel with a diameter of 965 mm.

Each produced wheel was heated for two hours at 900° C., and thereafter so-called "tread quenching" was performed in which the wheel was cooled by spraying water from a nozzle while rotating the wheel. When performing the tread quenching, the first cooling rate, which was the cooling rate from 900° C. to 550° C., and the second cooling rate, which was the cooling rate from 550° C. to 400° C., were varied. The first cooling rate and the second cooling rate are shown in Table 2. After tread quenching, tempering (treatment in which the wheel was held at 450° C. for two hours and then cooled in air) was performed. In Test No. 12, after the tempering, a high-temperature tempering (treatment in which the wheel was held at 650° C. for two hours and then cooled in air) was further performed. Test No. 14 corresponded to the conventional Class-C, and was a material with respect to which the first cooling rate and the second cooling rate were not varied. In this way, a railway wheel of each test number was produced.

TABLE 2

| Test Number | First cooling rate (° C./sec) | Second cooling rate (° C./sec) | σ0 (MPa) | C (GPa) | $\gamma$ | Formula (1) | (da/dN)/(da/dN)$_{Class\text{-}C}$ |
|---|---|---|---|---|---|---|---|
| 7 | 2.00-5.50 | 5.00-12.5 | 451 | 183 | 348 | Satisfied | 0.343 |
| 8 | 3.00-6.00 | 7.50-15.0 | 480 | 176 | 331 | Satisfied | 0.325 |
| 9 | 2.00-5.00 | 4.00-10.0 | 465 | 150 | 290 | Satisfied | 0.390 |

TABLE 2-continued

| Test Number | First cooling rate (° C./sec) | Second cooling rate (° C./sec) | σ0 (MPa) | C (GPa) | γ | Formula (1) | (da/dN)/(da/dN)$_{Class\text{-}C}$ |
|---|---|---|---|---|---|---|---|
| 10 | 2.00-5.00 | 5.00-14.0 | 515 | 140 | 260 | Satisfied | 0.354 |
| 11 | 0.100-0.900 | 0.100-0.900 | 429 | 112 | 246 | Not satisfied | 0.911 |
| 12 | 2.00-5.00 | 4.00-10.0 | 382 | 66 | 196 | Not satisfied | 3.080 |
| 13 | 0.100-0.400 | 0.100-0.400 | 482 | 102 | 188 | Not satisfied | 0.565 |
| 14 | 3.00-10.0 | 3.00-10.0 | 482 | 120 | 300 | Not satisfied | 1.000 |

A test specimen was prepared from the railway wheel of each test number. A cyclic compression-tension test was carried out by the method described above in the section [Cyclic compression-tension test] using the test specimen of each test number. The elastic limit $\sigma_0$, the initial kinematic hardening coefficient C, and the kinematic hardening coefficient reduction ratio γ of the test specimen of each test number were determined. The results are shown in Table 2. In addition, an FEM analysis was carried out under the conditions described above, and the ratio of the crack propagation rate (da/dN (mm/cycle)) of each test number to the crack propagation rate (da/dN (mm/cycle)) of Test No. 14 (conventional Class-C) was determined. The result is shown in the column ((da/dN)/(da/dN)$_{Class\text{-}C}$) in Table 2.

[Evaluation Results]

Referring to Table 2, in Test Nos. 7 to 10, the elastic limit $\sigma_0$ of the test specimen simulating a railway wheel was 430 MPa or more, the initial kinematic hardening coefficient C was 130 GPa or more, the kinematic hardening coefficient reduction ratio γ was 400 or less, and the initial kinematic hardening coefficient C and the kinematic hardening coefficient reduction ratio γ satisfied Formula (1). As a result, the ratio ((da/dN)/(da/dN)$_{Class\text{-}C}$) of the crack propagation rate with respect to the conventional Class-C was 0.500 or less. In Test Nos. 7 to 10, the propagation of cracks was further suppressed in comparison to the conventional railway wheel.

On the other hand, in Test Nos. 11 and 12, the elastic limit go was less than 430 MPa and the initial kinematic hardening coefficient C was less than 130 GPa, and the initial kinematic hardening coefficient C and the kinematic hardening coefficient reduction ratio γ did not satisfy Formula (1). As a result, the ratio ((da/dN)/(da/dN)$_{Class\text{-}C}$) of the crack propagation rate with respect to Class-C was more than 0.500. In Test Nos. 11 and 12, the propagation of cracks could not be further suppressed in comparison to the conventional railway wheel.

In Test Nos. 13 and 14, the initial kinematic hardening coefficient C was less than 130 GPa, and the initial kinematic hardening coefficient C and the kinematic hardening coefficient reduction ratio γ did not satisfy Formula (1). As a result, the ratio ((da/dN)/(da/dN)$_{Class\text{-}C}$) of the crack propagation rate with respect to Class-C was more than 0.500. In Test Nos. 13 and 14, the propagation of cracks could not be further suppressed in comparison to the conventional railway wheel.

An embodiment of the present disclosure has been described above. However, the embodiment described above is merely an example for carrying out the present disclosure. Therefore, the present disclosure is not limited to the above-described embodiment, and can be implemented by appropriately modifying the above-described embodiment within a range that does not depart from the gist of the present disclosure.

REFERENCE SIGNS LIST

10 Hub part
20 Rim part
21 Tread
22 Flange
30 Web part
60 Through hole
100 Railway wheel

The invention claimed is:

1. A railway wheel, comprising:

a hub part that forms an inner circumferential portion of the railway wheel, and that has a through hole for inserting an axle of a railway vehicle;

a rim part that forms an outer circumferential portion of the railway wheel, and that includes a tread to come into contact with a top surface of a rail on which the railway vehicle travels, and a flange protruding outward from the tread in a radial direction of the railway wheel; and an annular web part that connects the hub part and the rim part;

wherein:

in an outer layer of the rim part that includes the tread, an elastic limit $\sigma_0$ is 430 MPa or more, an initial kinematic hardening coefficient C is 130 GPa or more, and a kinematic hardening coefficient reduction ratio γ is 400 or less, where, the initial kinematic hardening coefficient C and the kinematic hardening coefficient reduction ratio γ satisfy Formula (1)

[Expression 1]

$$470 \leq \frac{C}{\gamma}\{1 - \exp(-0.007\gamma)\}. \quad (1)$$

2. A wheelset for railway vehicles, comprising:

a first railway wheel and a second railway wheel, the railway wheels each being according to claim 1, and the axle that is inserted into the through hole of the first railway wheel and the second railway wheel, and that extends in a rotational axis direction of the first railway wheel and the second railway wheel.

* * * * *